UNITED STATES PATENT OFFICE 2,440,660

HYDROGENOLYSIS OF STEROID THIOACETALS

Seymour Bernstein, Pearl River, and Louis Dorfman, New York, N. Y., assignors, by mesne assignments, to American Cyanamid Company, New York, N. Y., a corporation of Maine No Drawing. Application March 26, 1945, Serial No. 585,012

7 Claims. (Cl. 260—397.1)

This invention relates to the preparation of cyclopentanopolyhydrophenanthrene derivatives. More particularly, it relates to a method of preparing therapeutically useful cyclopentanopolyhydrophenanthrene derivatives having in the ring at the three position a methylene group.

The cyclopentanopolyhydrophenanthrene compounds of the present invention are prepared from 3-thioacetal steroids, described and claimed in our copending application Serial No. 585,011, filed March 26, 1945, by a process of hydrogenolysis. The hydrogenolysis may be illustrated by the following equation showing a specific example, the reduction of the diethyl thioacetal of cholestanone-3 with Raney nickel catalyst.

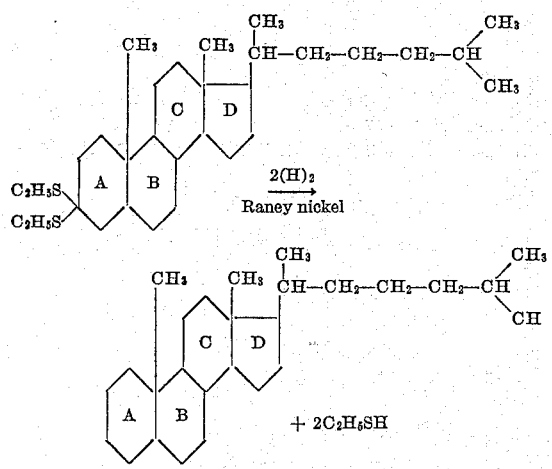

The 3-thioacetals steroids employed in the reaction of the present invention are prepared by mixing a 3-keto steroid with the desired alkyl or alkaryl mercaptan in the presence of a dehydrating agent. A great number of 3-thioacetal steroids can be employed in the reaction described herein. Among these may be specifically mentioned: coprostanone-3 diethyl thioacetal, ergostanone-3 diethyl thioacetal, stigmastanone-3 diethyl thioacetal, cholanic acid-3-dibutyl thioacetal, methyl-3-diethyl thioacetal cholanate, allocholanic acid-3-dibutyl thioacetal, ethyl-3-dibenzyl thioacetal cholanate, dehydrodesoxycholic acid-3-dipropyl thioacetal, and the like.

We may also use other 3-dialkyl or dialkaryl thioacetal cyclopentanopolyhydrophenanthrenes having a keto group, in the 7 or 11 position or in the 12 position a member of the group consisting of keto, hydroxy and alkoxy radicals. It may also have in the 17 position a radical such as hydroxy, ethoxy, hydroxyethyl, acetoxyethyl, or the normal bile acid side chain

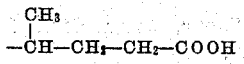

norbile acid side chain

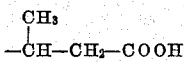

bisnor-bile acid side chain

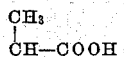

or the etio side chain, —COOH either as the free acid or in the form of the corresponding esters.

The process of the present invention may be illustrated generally, by the following equation:

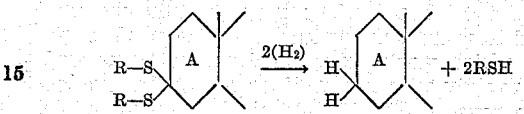

wherein R is alkyl or alkaryl radicals and A designates ring A or a cyclopentanopolyhydrophenanthrene compound.

In carrying out our invention we prefer to use as catalyst, modified Raney nickel, prepared at a low temperature from sodium hydroxide, water and nickel-aluminum alloy, as described in Organic Syntheses, vol. 21, page 15. In this reaction the hydrogen is obtained from the catalyst itself. For this reason the amount of catalyst which we have found most useful for our purposes is within the range of from about 1 part intermediate to 5 parts catalyst to about 1 part intermediate to about 50 or more parts catalyst.

The reaction of a thioacetal steroid with modified Raney nickel catalyst takes place at temperatures of from about 50° C. to about 100° C. or higher. The reaction is usually completed in from about 2 to about 24 hours depending on the temperature used. A convenient method of conducting the reaction is to mix the reactants in a suitable solvent or diluent and heat the reaction mixture on a steam bath until the reaction is complete.

We prefer to use dioxane as a solvent but other suitable solvents can be used such as Cellosolve, ethanol, methanol, butanol, etc. or a mixture of these solvents with each other.

In our preferred method the product is recovered from the reaction mixture by first allowing it to cool and then filtering to remove the catalyst and any unreacted material which may be present. On removal of the solvent the product is generally obtained as a viscous oil. When worked up with methanol the product crystallizes and is collected by filtration. Further purification can be carried out by recrystallizing the product from mixed solvents such as acetone and methyl alcohol.

Our invention will now be illustrated in greater detail by means of the following specific examples. It will be understood of course, that these examples are given for purposes of illustration and are not to be considered as limiting our invention to the particular details described therein. Parts are by weight unless otherwise designated.

*Example 1*

To 0.5 g. of cholestanone, 1 g. of anhydrous sodium sulfate and 0.5 g. of freshly fused zinc chloride there was added 10 cc. of ethyl mercaptan. The sodium sulfate appeared wet after a very short time. The material was placed in the refrigerator overnight. The excess ethyl mercaptan was evaporated in vacuo. Water was added to the solid residue. The product was then worked up in ether. The ether extract was washed with water, dilute sodium hydroxide and finally with water until neutral. The ether solution was dried over anhydrous sodium sulfate and then evaporated in vacuo. The solid residue was recrystallized from acetone and alcohol. A yield of 0.5 g. of cholestanone-3 diethyl thioacetal was obtained. A sample when recrystallized from dilute acetone had a melting point of 80°-82° C.

To a solution of 100 mg. of the diethyl thioacetal of cholestanone-3 in 15 cc. dioxane there was added 1.5 g. of modified Raney nickel catalyst. The mixture was heated on the steam bath for 17 hours. The reaction mixture was cooled to room temperature and filtered through celite which was then washed with dioxane and then rapidly with ether. The filtrate on evaporation gave an oil. Methyl alcohol was added to the oil and then evaporated. The new solid residue was boiled with methyl alcohol, in which it was insoluble, then cooled and filtered. An additional milligram of material was recovered from the mother liquor. The yield of cholestane was 0.067 g. (91%). On recrystallization from acetone-methyl alcohol the cholestane had a melting point of 78.5°-79° C. The product gave a negative nitroprusside test for the presence of sulfur and negative Liebermann test.

*Example 2*

To a solution of 0.1 g. of the diethyl thioacetal of 3-ketocholanic acid in 15 cc. dioxane there was added 1.5 g. of modified Raney nickel catalyst. The mixture was heated on the steam bath for 6 hours. The reaction mixture stood for two days at room temperature. The catalyst was removed by filtration and then dissolved in hydrochloric acid. Some solid did not dissolve and this was nickel sulfide and the desired product. The solid was collected by filtration and washed well with water. It was then washed in succession with hot alcohol, chloroform and acetone. The solvents were evaporated leaving a slightly yellow oil which on addition of alcohol, solidified. Water was added and the solid was filtered off. A yield of 0.050 g. of cholanic acid was obtained. This material gave a negative nitroprusside test for sulfur, was soluble in chloroform and became electrified on rubbing similar to cholanic acid. After three recrystallizations from dilute alcohol the desired cholanic acid melted at 157°-159° C. which is in close agreement with the melting point given in the literature for cholanic acid. The product gave a negative Liebermann test.

*Example 3*

To 610 mg. of the diethyl thioacetal of methyl 3-ketocholanate in 40 cc. dioxane there was added 9 g. of modified Raney nickel catalyst. The mixture was heated on the steam bath for 11 hours. The catalyst was then removed by filtration through celite and was washed with ether. The filtrate on evaporation gave a slightly yellow viscous oil which solidified on working with methyl alcohol. The solid was collected by filtration and washed with cold methyl alcohol, wt. 245 mg. From the mother liquor there was obtained 77 mg. more of crude methyl cholanate. Total yield of crude methyl cholanate, 322 mg. (69.7%). Recrystallization from acetone-methyl alcohol gave pure methyl cholanate.

We claim:

1. A method of preparing cholestane which comprises heating cholestanone-3 diethyl thioacetal with Raney nickel catalyst in dioxane.

2. A method of preparing cholanic acid which comprises heating 3-keto cholanic acid diethyl thioacetal with Raney nickel catalyst in dioxane.

3. A method of preparing methyl cholanate which comprises heating methyl 3-keto cholanic acid diethyl thioacetal with Raney nickel catalyst in dioxane.

4. A method of preparing compounds having the formula

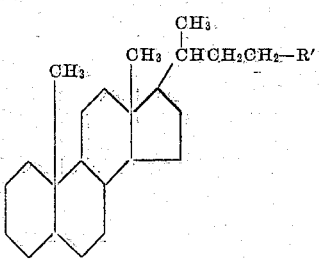

wherein R' is a member of the group consisting of alkyl, carboxy and carbalkoxy radicals which comprises heating a compound having the formula

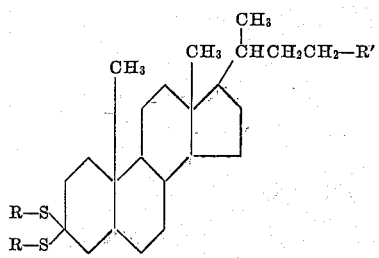

wherein R is alkyl and R' is as defined above, with Raney nickel catalyst in the presence of a solvent selected from group consisting of dioxane, a lower aliphatic alcohol and ethyleneglycol ethylether.

5. A method of preparing an alkyl ester of cholanic acid, which comprises heating an alkyl ester of 3-keto cholanic acid dialkyl thioacetal with Raney nickel catalyst in dioxane.

6. A method of preparing cholanic acid which comprises heating a 3-keto cholanic acid dialkyl thioacetal with Raney nickel catalyst in dioxane.

7. A method of preparing cholestane which comprises heating a cholestanone-3-dialkyl thioacetal with Raney nickel catalyst in dioxane at a temperature of from about 50° C. to about 100° C.

SEYMOUR BERNSTEIN.
LOUIS DORFMAN.

REFERENCES CITED

The following references are of record in the file of this patent:

Barr et al.: "Jour. Chem. Soc.," London, 1936, pages 1437-1440.